United States Patent
Dietz

(10) Patent No.: US 6,265,471 B1
(45) Date of Patent: *Jul. 24, 2001

(54) HIGH THERMALLY CONDUCTIVE POLYMERIC ADHESIVE

(75) Inventor: Raymond Louis Dietz, Georgetown, MA (US)

(73) Assignee: Diemat, Inc., Byfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/810,554

(22) Filed: Mar. 3, 1997

(51) Int. Cl.$^7$ ........................................ C08F 2/16
(52) U.S. Cl. ................ 523/458; 156/307.5; 524/440
(58) Field of Search ................ 523/458; 524/440; 156/307.5

(56) References Cited

U.S. PATENT DOCUMENTS

| | | |
|---|---|---|
| 2,774,747 * | 12/1956 | Wolfson et al. ............... 523/458 |
| 3,716,489 | 2/1973 | DeLapp . |
| 4,469,714 * | 9/1984 | Wada et al. ............... 523/458 |
| 4,564,563 | 1/1986 | Martin et al. . |
| 4,780,371 * | 10/1988 | Joseph et al. ............... 523/458 |
| 4,933,030 | 6/1990 | Dietz . |
| 5,011,627 | 4/1991 | Lutz . |
| 5,322,864 * | 6/1994 | Sugimoto et al. ............... 523/458 |
| 5,391,604 | 2/1995 | Dietz . |
| 5,480,957 | 1/1996 | Muroi et al. . |
| 5,929,141 * | 7/1999 | Lau et al. ............... 523/458 |

FOREIGN PATENT DOCUMENTS

| | | | |
|---|---|---|---|
| 237840 * | 7/1986 | (DE) ............... 523/458 |
| 60-1221 * | 1/1985 | (JP) ............... 524/440 |
| 1-304150 * | 12/1989 | (JP) ............... 524/440 |
| 36738 * | 2/1993 | (JP) ............... 156/330 |

* cited by examiner

Primary Examiner—John J. Gallagher
(74) Attorney, Agent, or Firm—Huntley & Associates

(57) ABSTRACT

A thermosetting adhesive paste exhibiting a high thermal conductivity suitable for die attach applications.

12 Claims, No Drawings

HIGH THERMALLY CONDUCTIVE POLYMERIC ADHESIVE

BACKGROUND OF THE INVENTION

The invention described herein relates to an adhesive paste for bonding higher power devices to a substrate with a minimum of thermal resistance through the adhesive bondline and the method of use.

The attachment of active devices, such as semiconductor dies, to a substrate or in an electronic package has historically been accomplished using organic or inorganic adhesives. Typically, a semiconductor die is bonded to a substrate that is part of the semiconductor package. The adhesives that accomplish this bonding or attachment are usually in the form of a wet paste which consists of (1) a binder or adhesive component, (2) a filler, and (3) an optional diluent.

The purpose of the adhesive is to create a bond between the semiconductor device and the substrate. This adhesive layer between the device and substrate is often referred to as the bondline. Inorganic and organic binders have both previously been used. The most common inorganic binders are glass, solder, or a eutectic of Si and Au. Generally, this type of binder is used in inorganic packages, such as ceramic or metal. They are not generally adaptable to bonding die in plastic packages because of the high temperature processing required. The lowest attach temperature, for example, with Ag filled glass is about 300° C. as described in U.S. Pat. No. 4,933,030. This processing temperature, however, is too high for use with a plastic laminate package. On the other hand, the thermal conductivity of these inorganic adhesive systems is high, ranging about from 40 to 65 W/mK.

Organic binders are the most common type of binders used for die attach in plastic packages because of their low processing temperatures. However, the thermal conductivities of prior organic adhesive systems have been limited to about 3–4 W/mK, thus limiting the amount of heat dissipation possible in plastic packages.

Organic binders can be further classified into thermoset and thermoplastic. Thermoplastic organic binders are described in detail in U.S. Pat. No. 5,391,604. Thermosetting binders, as the name implies, "set up" or "crosslink" during a thermal excursion. Typically, a thermoset adhesive contains an epoxy resin, a hardener, a filler, and in many cases a small amount of reactive solvent. The function of the hardener is to crosslink with the epoxy resin and change from a liquid to a solid. More recently, as described in U.S. Pat. No. 5,480,957, the hardeners can be "latent" i.e., they do not react with the resins until well above room temperature. The use of a latent hardener extends the pot life or time at room temperature before the viscosity increases to an unacceptable level for dispensing as a result of room temperature crosslinking.

Other ingredients sometimes used in thermoset adhesives in combination with an epoxy resin include a reactive diluent or solvent. The reactive solvent is typically an unsaturated low viscosity monomer capable of crosslinking with the epoxy and becoming part of the hardened structure. It is used to lower the viscosity of the epoxy resin to allow more loading of the filler. Thus, in the case of electro conductive adhesives, in which the filler usually is silver, higher electrical and thermal conductivities are realized. However, because of the lower molecular weight of the reactive solvent, only a limited amount can be used without sacrificing heat resistance and other functional properties. Thus, thermal conductivities have been limited to about 3–4 W/mK in prior art organic adhesives.

In some cases, a fugitive non-reactive solvent is used with an epoxy resin. For example, U.S. Pat. No. 3,716,489 describes a volatile solvent used to dissolve a photochromic material in an epoxy resin to form a transparent epoxy photochromic filter. Unlike the invention described herein, the above material is not used as an adhesive nor is it loaded with a particulate conductive filler.

U.S. Pat. Nos. 5,011,627 and 4,564,563 further describe screen printable electro conductive pastes that include fugitive, non-reactive solvents that are used to dissolve the thermoplastic and epoxy resins. These examples, however, are used as conductive traces, such as on membrane keyboards, rather than adhesives and hence the solvents are easily evaporated before entrapment in the structure by the crosslinking. Thus, they could not be employed as adhesives wherein the solvents must be volatized from the bondline between the die and substrate before crosslinking occurs to avoid entrapment of the solvent and voids.

SUMMARY OF THE INVENTION

The instant invention provides an organic adhesive with a thermal conductivity an order of magnitude higher than those previously available, and, in addition, is easily dispensed and processed at low temperatures, provides a strong adhesive bond between the die and substrate, and good storage characteristics.

Specifically, the present invention provides a thermosetting adhesive paste comprising by volume:

a) about 15–75% of one part thermosetting liquid resin, b) up to about 45% solvent, and c) about 20–45% conductive filler, the paste, when cured, having an electrical resistivity less than about $50 \times 10^{-6}$ ohm-cm and a thermal conductivity greater than about 5 W/mK.

There is also provided a method of using the adhesive paste to bond microcircuit components to substrates and the assembled article that is useful in the electronic industry.

The present invention further provides a method of attaching a component to a substrate which comprises applying a paste as defined above to the substrate at a thickness of at least about 3 mils, placing the component on top of the applied adhesive and within 3 mils of the substrate, and preferably within about 1 mil, with the adhesive filling the bondline, and heating the assembly to a temperature of at least about 150° C. for at least about 1 hour.

DETAILED DESCRIPTION OF THE INVENTION

Each of the principal components of the adhesive pastes of the present invention is described below and as an integral part of the unique paste system which provides unexpectedly high thermal properties.

Thermoset Resin/Hardener

A wide variety of known thermoset resins can be used in the present invention, and will be selected depending on the functional requirements of the cured material. Preferred are cycloaliphatic epoxy resins having a molecular weight of less than about 1000 and preferably less than about 500. Resins found to be particularly satisfactory are those manufactured by Ciba Geigy and available under product codes LMB5414 and LMB6136. The low viscosity of the resin is attractive to allow a high percent loading of the filler at a reasonable viscosity without the use of a large amount of fugitive solvent.

The hardener which is incorporated in the liquid resin should be latent, that is, is activated at temperatures greater than about 100° C. The specific hardener is selected to be effective at a temperature which is compatible with the fugitive solvent properties, as more fully discussed below. The LMB5414 resin with hardener system delays the start of crosslinking to above 100° C., and has been found to be particularly satisfactory.

The latency of the curing or crosslinking is a key parameter of the system. Crosslinking must be delayed sufficiently in temperature to allow a sufficient amount of the fugitive solvent to be extracted or dried from the adhesive matrix. If too much crosslinking occurs before the solvent evolves from the adhesive, the solvent can become entrapped under the die in the three dimensional network that results from crosslinking. Thus, the relationship between the vapor pressure of any solvent used and the latency of the crosslinking is important.

It is preferable that the resin be substantially free of alkali and halide ions. If such ions are present in the cured adhesive product in a non-hermetic environment, they can migrate to the bond areas, resulting in undesirable conditions including corrosion.

Solvent

The solvent preferably used in this invention is characterized by the following general properties:
1) non-reactive with the resin, e.g., does not become part of the crosslinked epoxy system;
2) preferably the resin is soluble in the solvent;
3) non-bleeding, i.e., a slightly polar solvent with some surface tension is desirable to minimize the bleeding at the edge of the die attach fillet; and
4) low vapor pressure, i.e., a solvent that can be largely extracted from the matrix with elevated temperatures within a practical time.

Within these parameters, a wide variety of solvents can be used, including, for example, alcohols, ethers, esters and ketones. Non soluble solvents tend to separate, increase the viscosity, and yield a poorly cured structure. The specific degree of solubility is not critical, although the less soluble solvents tend to dry or extract from the system more easily with heat. If the vapor pressure of the solvent is too high, the solvent tends to evaporate from the adhesive paste during storage at room temperature and hence increase the viscosity and degrade dispensing properties. If the vapor pressure is too low, the time required to extract or dry the solvent out of the resin matrix is impractically long. When the adhesive is under a large die, the rate of drying is further impeded, making the choice of solvent more critical.

The specific solvent should be selected so that most of the fugitive solvent, and preferably greater than 90%, is extracted from the adhesive matrix before any significant crosslinking occurs. If the solvent extraction is not sufficient, the crosslinking can entrap the solvent in the matrix, causing voids in the bond and poor adhesion. Preferably, the components are selected to limit crosslinking of the resin during initial drying to less than about 15% such that most of the solvent is evolved. One solvent found to be particularly satisfactory in the present invention is Terpineol 318 manufactured by Hercules.

The use of a solvent is preferred because the solvent can reduce the viscosity of the adhesive paste, permitting a higher loading of filler. Higher filler loading can be desirable because the resulting cured adhesive product can exhibit lower electrical resistivity and higher thermal conductivity. Accordingly, about from 1 to 45% by volume is present in the paste.

Filler

The specific filler used in the present invention is selected to meet the electrical or thermal requirements of the cured adhesive. It is desirable to provide both high thermal conductivity and high electrical conductivity in the cured adhesive. The filler can, for example, be selected from at least one of silver, gold, nickel, copper, zinc, tin palladium and platinum. Of these, silver is preferred, and has been found to provide a desirable combination of high thermal and electrical conductivity. Generally speaking, silver flakes or a combination of flakes and spheres provide the highest volume loading of the filler in the paste. A combination of two flakes, one large and one small, have been found to be particularly satisfactory. Silver flakes that can be used include those having a surface area in the range of about 0.2 to 3 $m^2$/gm and a tap density in the range of about 2 to 5 gm/cc.

Additives

Various additives can be combined with the pastes of the present invention to enhance certain properties of the adhesive such as modulus of elasticity, resin bleed, and thermal conductivity.

In attaching larger area silicon dies to a substrate, the interfacial shear stresses developed at the bondline interfaces can become severe if the coefficient of expansion of the die and substrate are largely mismatched. The shear stress developed is not only a function of the thermal expansion mismatch of the adjoining parts, but also of the modulus of elasticity of bondline material, i.e., the die attach material. Thus, it is very desirable to design the cured die attach material with a low modulus (resiliency) to absorb the stress created by the typical expansion mismatches of the die and the substrate. One way to accomplish this is to add small amounts of lower modulus elastomers, rubbers, silicone, thermoplastics, or the like in fine particle form.

Thermoplastics, in general, are much lower in modulus than thermosetting resins. For this invention, thermoplastic additives are preferred. The advantage of using thermoplastic powder is that it also contributes to the bonding by melting and forming an interpenetrating network (IPN) within the epoxy resin matrix. This will be illustrated later.

Undesirable epoxy resin bleed on the edge of a deposit has sometimes been a functional problem with prior art. By the use of high surface area, fine particles, this resin bleed was curtailed. In the present invention, high surface area silver and silica can be used in small amounts to alleviate this problem. Too much of the high surface area additive would increase the viscosity excessively or could adversely impact post cure properties such as conductivity and adhesion. In addition, small amounts of viscosity modifiers, such as ethyl cellulose, can be incorporated in the composition to reduce edge bleeding. Typically, about from 0.5 to 1% by volume can be used effectively.

A small amount of fine ceramic powder such as diamonds can also be added to enhance the silver particle to particle thermal interface, thereby increasing the thermal conductivity of the cured adhesive.

EXAMPLES 1–53

This invention is now illustrated by certain representative embodiments. The examples are intended to be illustrative only, and modifications and equivalents of the invention will be evident to those skilled in the art. The preferred ingredients are summarized in Table I.

TABLE I

| Ingredient | Code | Description |
|---|---|---|
| Epoxy resin | LMB5414<br>LMB6136 | Ciba Geigy Araldite cycloalphatic, low viscosity resin with latent hardener |
| Solvent | Terpineol 318 | Terpine alcohol from Hercules |
| Filler | Degussa #80 Ag Flake<br>Degussa #67 Ag Flake | SA = 0.55 m$^2$/g TD = 4.5 g/cc<br>SA = 1.75 m$^2$/g TD = 3.5 g/cc<br>(typical values) |
| Additives | Aerosil #200<br>Diamond powder<br>#5183 Thermoplastic<br>#50-S Ag | Fine SiO2 powder from Degussa<br>Powder from Warren Diamond<br>Powder from Bostik<br>Fine, high surface area Ag from Degussa | in the adhesive composition are expressed in volume %. Adhesive pastes were prepared by first adding the solvent to the epoxy resin, which for the purpose of illustration was confined to LMB5414. Then the filler was admixed by hand stirring followed by a three roll milling process which uniformly distributes and wets the filler particles homogeneously. Additives, if used, can be added with the filler, or three roll milled separately to ensure uniform distribution.

To test the adhesive compositions, a small amount was deposited on a substrate, which in this case was 92% black alumina. The volume deposited was dependent on the size of the die to be attached. For example, for a 0.100 die about 1 μl was used, for a 0.250 die about 5 μl, and for a 0.500 die about 19 μl. The die was then placed over the deposit with tweezers and pushed down until resistance was encountered.

The curing schedule, or heat treatment, was tailored to allow the fugitive liquid or solvent to escape the matrix before an excessive amount of crosslinking occurred. The rate of solvent extraction from the adhesive matrix is dependent on the size of the die attached. The larger the die, the longer time required for the solvent to migrate to the edge of the die and evaporate from the fillet around the die. The various curing schedules used to illustrate the invention are tabulated in Table III. The curing schedule can be divided into 2 main parts: a ramp expressed in ° C./min to reach a hold temperature, and the dwell, expressed in minutes, at the hold temperature.

The latency of the LMB5414 resin loaded with Ag flake is illustrated by Differential Scanning Calorimeter analysis and summarized in Table IV. From this data, it can be seen that if the drying temperature is kept below about 100° C., very little crosslinking (16.7% cure) occurs in up to about 2 hours. Thus, a solvent was chosen (Terpineol 318) that has sufficient vapor pressure that allows at least about 90% extraction of the solvent from under a die up to 0.500 inch square when dried at a temperature less than about 110° C. for a period of time less than about 1 hour. For die sized 0.250 inch square, no separate drying schedule is required so long as the ramp is slow enough to allow sufficient drying before the peak temperature reaches about 125° C.

The percent dry was calculated by weighing the die assembly wet, after dry, and after final cure. All dry schedules were at a peak temperature of about 100° C., as shown in Table V. The final cure was performed at about 175° C. for about 15 minutes. By subtracting the weight after dry from the wet weight and dividing by the wet weight, the % of solvent extracted during the drying step was calculated. The % dry for different size die dried at different schedules is summarized in Table V.

After the die attached assembly was cured, the adhesions were tested by either a shear or tensile method. For die sizes of up to about 0.250 inch square, the die shear method was used. For die sizes greater than about 0.250 inch square, the tensile method was used. To measure voids created in the bondline during processing, a transparent glass microscope slide was substituted for the substrate and the die attached. Voids were then characterized by visual inspection and ranked from 0 through 4 where 0 is the best or minimum voids.

The thermal conductivity (k) was measured by casting small disc-shaped pellets representing the structure of a processed die attach film. Each test material was cast in a Teflon mold of 12 mm diameter and 2.5 mm thickness and processed through a typical firing profile. Once removed from the mold, the pellet was analyzed and tested for thermal conductivity. This conductivity is dependent on three measurable properties: the specific heat (Cp), the density (ρ), and the thermal diffusivity (α). This relationship is shown in the following equation:

$$k = C_p \times \rho \times \alpha$$

The specific heat (Cp) is defined as the energy required to heat one gram of material by 1° C. and is a fixed value for a given formulation. It can be measured by several methods including the laser flash method, DSC analysis, and mass averaging each component in the composition. Excellent correlation between these three methods was demonstrated. The method of mass averaging of the specific heats of each material component was employed for these calculations.

The material density (ρ) is also fixed, dependent on the formulation, but is reduced below the theoretical density by any porosity in the structure. The density used must be representative of those values in a practical application. The actual density of our test samples was calculated using the measured values of weight, diameter, and thickness of each pellet. The difference of the actual to theoretical density is defined as the volume porosity of the test samples.

Thermal diffusivity, (α), the final variable of thermal conductivity, indicates how quickly a material can change temperature. This value can be measured, as with the specific heat, by the laser flash method. The laser flash method is considered the most accurate (+/− five percent) in measuring diffusivities of materials with k values over 1 W/mK. Because the diffusivity values were tested at an outside source, a second source was used as verification for some materials.

Table VI summarizes the various examples showing the impact of the varying components and processing. Examples 1 through 16 illustrate the impact of the solvent. Examples 1 through 3 have no solvent and are characterized by the low k values and poor adhesion in 0.500 inch die because of the high stress caused by the low resiliency of the crosslinked film. The biggest problem with the DBE (DuPont's Diisobutyl Ester) was the bleeding, whereas a dearomatized aliphatic solvent (680) also dried too fast. Terpineol 318 had the best properties to be integrated in the system.

The impact of the filler is demonstrated in Examples 13 through 19, showing the 67/80 at a ratio of about 1:1 combination was far superior to the 80/002 at a ratio of about 7:3 combination of Ag powders.

With the optimum solvent and Ag filler, the remaining examples concentrate on developing the optimum adhesive and process to yield the most favorable cured properties. These desired properties include minimum voids in the BLT (bond line thickness), high die adhesion for all size die (0.100 to 0.500 inch), low bulk electrical resistivity (ρ) and most importantly, high bulk thermal conductivity (k).

Lot F387 met all the criteria except large die adhesion. This weakness was overcome by increasing the volume percent binder as in F717 and F718. However, as can be seen, there is a compromise between large area die adhesion (LADA) and k, and the optimum choice of material would depend on the application. For example, for a die size less than about 0.250 inch square, composition F387 would be the choice, with a k of about 60 W/mK. For die sizes larger than about 0.250 inch square, composition F717 would be the choice, with a k of about 45 W/mK.

The data confirm that a wide variety of process parameters can be used. For die sizes less than about 0.250 inch square, it was shown no drying step was required. Thus, the solvent escapes sufficiently during the ramp up to the curing temperature before an excess of crosslinking entraps the solvent. However, for die sizes greater than about 0.250 inch square, an intermediate hold temperature of about 100° C. is required to remove the majority of the solvent before being entrapped by the crosslinking. Time at 100° C. can vary between about 30 and 60 minutes with good results.

To reduce the stress caused by high Young's modulus of the cured epoxy, 12.3% by volume of a silicone rubber powder from Dow (product code #23) was added. The final paste then had by volume:

| | |
|---|---|
| 37.3% | LMB5414 binder |
| 22.5% | 67/80 Ag |
| 27.9% | Terpineol 318 |
| 12.3% | Additive #23 |

Using curing cycle #3 from Table III, the adhesion in a 0.500 inch die was greater than 100 pounds, compared to 30 pounds without the additive (Example #24). This shows the significance of reducing the stress at the interfaces of the bondline. A resistivity of 32.2×10−6 ohm-cm and a k of 5.61 W/mK were measured, which for a volume of 22.5% Ag is surprisingly high.

Similarly, when a thermoplastic powder (#5183 from Bostik) was substituted for Additive #23, the results were improved for large area die adhesion. The adhesion was 162.7 pounds using No. 5183 thermoplastic powder.

Compositions F387 and F717 were checked for bleeding by doctor blading the materials on bare alumina at about a 5 mil wet thickness. Inspection after about 15 minutes showed about 20–40 mil bleeding of the solvent away from the edge of the deposit. To curtail this, an amount of high surface area powder, 50-S Ag or Aerosil, was incorporated into the composition as summarized in Table II by weight percentage:

TABLE II

| | F717/02056 | F739 | F740 |
|---|---|---|---|
| LMB5414 | 6.4 | 6.3 | 6.2 |
| 67/80 Ag | 84.6 | 79.2 | 81.9 |
| 50 - S Ag | | 4.5 | |
| Aerosil | | | 0.9 |
| Terp | 9.0 | 10.0 | 11.0 |

These were tested in the same manner as F387 and F717. A significant decrease in the bleeding was measured.

Another method to control the bleeding is to predissolve at least one viscosity modifying resin in the fugitive solvent before combining with the epoxy resin. Three different molecular weight ethyl cellulose powders, namely, EHEC, N4, and N100, all from Hercules were predissolved in Terpineol 318 and used as the fugitive solvent in the adhesive composition. A significant decrease in bleeding was noted. A combination of the aerosol and ethyl cellulose further abated the bleeding.

Diamond particles of various sizes and amounts were added to various pastes to modify the particle to particle contact. In some cases it was beneficial, in others detrimental, but did show the potential for increasing the thermal conductivity.

The above examples are illustrative only to demonstrate the invention.

TABLE III

| Cure Schedule | Ramp No. | Ramp (° C./min) | Hold Temp. (° C.) | Hold Time (min) |
|---|---|---|---|---|
| 1 | 1 | 35 | 175 | 15 |
| 2 | 1 | 30 | 100 | 30 |
|   | 2 | 6 | 175 | 15 |
| 3 | 1 | 30 | 100 | 60 |
|   | 2 | 6 | 175 | 15 |
| 4 | 1 | 35 | 200 | 15 |
| 5 | 1 | 35 | 175 | 30 |
| 6 | 1 | 30 | 100 | 60 |
|   | 2 | 6 | 175 | 30 |
| 7 | 1 | 30 | 100 | 60 |
|   | 2 |   | 25 |   |
|   | 3 | 35 | 175 | 30 |
| 8 | 1 | 30 | 100 | 60 |
|   | 2 |   | 25 |   |
|   | 3 | 13 | 175 | 30 |
| 9 | 1 | 10 | 175 | 30 |
| 10 | 1 | 30 | 110 | 60 |
|   | 2 | 6 | 175 | 15 |
| 11 | 1 | 10 | 175 | 15 |
| 12 | 1 | 30 | 110 | 30 |
|   | 2 | 6 | 175 | 15 |

TABLE IV

PERCENTAGE CURE

| TEMPERATURE (° C.) | TIME (MIN) | % CURE |
|---|---|---|
| 50 | 180 | 0.0 |
| 50 | 1140 | 0.0 |
| 100 | 120 | 16.7 |
| 100 | 210 | 79.9 |
| 100 | 315 | 93.1 |
| 125 | 30 | 73.0 |
| 125 | 45 | 68.9 |
| 125 | 65 | 90.8 |
| 150 | 10 | 78.9 |
| 150 | 10 | 94.8 |
| 150 | 15 | 98.8 |
| 150 | 20 | 100.0 |
| 175 | 6 | 100.0 |
| 200 | 1 | 100.0 |

TABLE V

PERCENTAGE DRY

| DIE SIZE (IN.) | DRY TEMP. (° C.) | DRY TIME (MIN) | % DRY |
|---|---|---|---|
| 0.250 | 110 | 30 | 89.8 |
| 0.250 | 100 | 60 | 92.2 |
| 0.250 | 110 | 60 | 93.8 |
| 0.250 | 110 | 120 | 98.1 |
| 0.250 | 110 | 180 | 98.4 |
| 0.400 | 110 | 30 | 86.0 |
| 0.400 | 110 | 60 | 93.1 |
| 0.400 | 110 | 120 | 97.1 |
| 0.400 | 110 | 180 | 98.5 |
| 0.400 | 110 | 30 | 84.8 |
| 0.500 | 110 | 60 | 88.6 |

TABLE V-continued

PERCENTAGE DRY

| DIE SIZE (IN.) | DRY TEMP. (° C.) | DRY TIME (MIN) | % DRY |
|---|---|---|---|
| 0.500 | 110 | 60 | 93.4 |
| 0.500 | 110 | 120 | 95.2 |
| 0.500 | 110 | 180 | 97.3 |

TABLE VI

| Example | Lot # | Binder wt % | Ag Type | Filler wt % | Solvent Type | Solvent wt % | Curing Sched. | Die Size (in.) | Subst. | Voids (in BLT) | Die Adh. (lb.) | Bulk ρ (μΩ-cm) | Bulk k (W/mK) |
|---|---|---|---|---|---|---|---|---|---|---|---|---|---|
| 1 | F219 | 25.0 | 67/80 | 75.0 | none | 0.0 | 1 | 0.250 | Alumina | | 151.9+ | 67.1 | 4.1 |
| 2 | F219 | 25.0 | 67/80 | 75.0 | none | 0.0 | 1 | 0.400 | Alumina | 2 | 196.5+ | | 4.1 |
| 3 | F219 | 25.0 | 67/80 | 75.0 | none | 0.0 | 1 | 0.500 | Alumina | 0 | 227+ | | 4.4 |
| 4 | F339 | 9.6 | 80/002 | 86.7 | DBE | 3.7 | 1 | 0.250 | Alumina | | 71.3 | 13.2 | 8.7 |
| 5 | F339 | 9.6 | 80/002 | 86.7 | DBE | 3.7 | 1 | 0.500 | Alumina | 4 | | | |
| 6 | F-358-2 | 9.6 | 67/80 | 86.6 | DBE | 3.8 | 1 | 0.250 | Alumina | | 47.8 | 13.6 | 21.0 |
| 7 | F361 | 8.9 | 67/80 | 80.7 | 680 | 10.4 | 1 | 0.250 | Alumina | | 59.2 | 14.2 | 46.3 |
| 8 | F361 | 8.9 | 67/80 | 80.7 | 680 | 10.4 | 1 | 0.400 | Alumina | | 70.0 | | |
| 9 | F361 | 8.9 | 67/80 | 80.7 | 680 | 10.4 | 1 | 0.500 | Alumina | 0 | | | 20.5 |
| 10 | F363 | 18.7 | 67/80 | 66.3 | DBE | 15.0 | 1 | 0.250 | Alumina | | 34.5 | 9.0 | |
| 11 | F363 | 18.7 | 67/80 | 66.3 | DBE | 15.0 | 1 | 0.400 | Alumina | | 11.3 | | |
| 12 | F363 | 18.7 | 67/80 | 66.3 | DBE | 15.0 | 1 | 0.500 | Alumina | 1 | | | |
| 13 | F468 | 4.6 | 96/02 | 88.0 | N15 | 7.4 | 1 | 0.250 | Alumina | | 33.8 | 9.4 | 39.8 |
| 14 | F468 | 4.6 | 96/02 | 88.0 | N15 | 7.4 | 2 | 0.250 | Alumina | | 48.8 | 9.5 | |
| 15 | F385 | 9.6 | 80/002 | 88.6 | Terp | 3.8 | 1 | 0.250 | Alumina | | 64.0 | 11.2 | |
| 16 | F386 | 4.6 | 80/002 | 88.0 | Terp | 7.4 | 1 | 0.250 | Alumina | | 53.0 | 8.3 | 71.8 |
| 17 | F386 | 4.6 | 80/002 | 88.0 | Terp | 7.4 | 1 | 0.400 | Alumina | | 34.8 | | |
| 18 | F386 | 4.6 | 80/002 | 88.0 | Terp | 7.4 | 2 | 0.250 | Alumina | | 62.8 | 8.2 | |
| 19 | F387 | 4.9 | 67/80 | 86.6 | Terp | 8.5 | 1 | 0.100 | Alumina | | 14.8 | 7.4 | 53.6 |
| 20 | F387 | 4.9 | 67/80 | 86.6 | Terp | 8.5 | 1 | 0.100 | Cu | | 6.5 | 7.5 | 66.3 |
| 21 | F387 | 4.9 | 67/80 | 86.6 | Terp | 8.5 | 1 | 0.100 | Ag/Cu | | 9.5 | | 56.2 |
| 22 | F387 | 4.9 | 67/80 | 86.6 | Terp | 8.5 | 1 | 0.250 | Alumina | 2 | 43.1 | 7.7 | |
| 23 | F387 | 4.9 | 67/80 | 86.6 | Terp | 8.5 | 1 | 0.250 | Ni/Cu | | 11.7 | | |
| 24 | F387 | 4.9 | 67/80 | 86.6 | Terp | 8.5 | 1 | 0.500 | Alumina | 1 | 30.0 | | |
| 25 | F387 | 4.9 | 67/80 | 86.6 | Terp | 8.5 | 2 | 0.250 | Alumina | 0 | 63.4 | 6.9 | |
| 26 | F387 | 4.9 | 67/80 | 86.6 | Terp | 8.5 | 3 | 0.250 | Alumina | 1 | 75.4+ | 6.7 | 53.6 |
| 27 | F387 | 4.9 | 67/80 | 86.6 | Terp | 8.5 | 4 | 0.080 | Alumina | | 16.5 | 7.6 | |
| 28 | F387 | 4.9 | 67/80 | 86.6 | Terp | 8.5 | 5 | 0.80 | Alumina | | 9.8 | 7.0 | |
| 29 | F387 | 4.9 | 67/80 | 86.6 | Terp | 8.5 | 5 | 0.100 | Alumina | | 9.8 | | |
| 30 | F387 | 4.9 | 67/80 | 86.6 | Terp | 8.5 | 6 | 0.100 | Alumina | | 12.3 | | |
| 31 | F387 | 4.9 | 67/80 | 86.6 | Terp | 8.5 | 6 | 0.250 | Alumina | | 115.0 | | 66.3 |
| 32 | F387 | 4.9 | 67/80 | 86.6 | Terp | 8.5 | 7 | 0.100 | Alumina | | 21.1 | | 53.6 |
| 33 | F387 | 4.9 | 67/80 | 86.6 | Terp | 8.5 | 7 | 0.250 | Alumina | | 95.0 | | |
| 34 | F387 | 4.9 | 67/80 | 86.6 | Terp | 8.5 | 8 | 0.100 | Alumina | | 14.2 | | |
| 35 | F387 | 4.9 | 67/80 | 86.6 | Terp | 8.5 | 8 | 0.250 | Alumina | | 111.0 | | 66.3 |
| 36 | F387 | 4.9 | 67/80 | 86.6 | Terp | 8.5 | 9 | 0.100 | Alumina | | 14.6 | | 53.6 |
| 37 | F387 | 4.9 | 67/80 | 86.6 | Terp | 8.5 | 10 | 0.400 | Alumina | | 29.7 | | 61.8 |
| 38 | F387 | 4.9 | 67/80 | 86.6 | Terp | 8.5 | 10 | 0.400 | Alumina | 0 | 31.0 | 9.1 | 56.2 |
| 39 | F387 | 4.9 | 67/80 | 86.6 | Terp | 8.5 | 10 | 0.500 | Alumina | | 22.5 | | |
| 40 | F387 | 4.9 | 67/80 | 86.6 | Terp | 8.5 | 10 | 0.500 | Alumina | 0 | | | |
| 41 | F387 | 4.9 | 67/80 | 86.6 | Terp | 8.5 | 10 | 0.500 | Alumina | | 7.0 | | |
| 42 | F387 | 4.9 | 67/80 | 86.6 | Terp | 8.5 | 11 | 0.100 | Alumina | | 20.3 | | |
| 43 | F387 | 4.9 | 67/80 | 86.6 | Terp | 8.5 | 12 | 0.100 | Alumina | | 20.5 | | |
| 44 | F387 | 4.9 | 67/80 | 86.6 | Terp | 8.5 | 11 | 0.250 | Alumina | | 72.3 | | |
| 45 | F387 | 4.9 | 67/80 | 86.6 | Terp | 8.5 | 12 | 0.250 | Alumina | | 108.3 | | |
| 46 | F590 | 6.7 | 30001/10 | 86.6 | Terp | 6.7 | 1 | 0.500 | Alumina | | | 93.5 | |
| 47 | F663 | 25.0 | 103/80 | 75.0 | none | 0.0 | 1 | 0.250 | Alumina | 2 | 123.1 | 67.2 | |
| 48 | F717 | 6.4 | 67/80 | 84.6 | Terp | 9.0 | 1 | 0.100 | Ag/Cu | | 15.0 | | 43.0 |
| 49 | F717 | 6.4 | 67/80 | 84.6 | Terp | 9.0 | 10 | 0.400 | Alumina | 2 | 106.0 | 8.4 | |
| 50 | F717 | 6.4 | 67/80 | 84.6 | Terp | 9.0 | 10 | 0.500 | Alumina | 1 | 91.0 | | |
| 51 | F718 | 8.2 | 67/80 | 82.8 | Terp | 9.0 | 1 | 0.100 | Ag/Cu | | 16.0 | | 24.8 |
| 52 | F718 | 8.2 | 67/80 | 82.8 | Terp | 9.0 | 10 | 0.400 | Alumina | 3 | 121.0 | 9.6 | |
| 53 | F718 | 8.2 | 67/80 | 82.8 | Terp | 9.0 | 10 | 0.500 | Alumina | 3 | 129.0 | | |

I claim:
1. A thermosetting adhesive paste consisting essentially of by weight:
   a) about 5–16% of one part thermosetting liquid epoxy resin combined with latent hardener,
   b) about 4–15% solvent consisting essentially of non-reactive, fugitive solvent, and
   c) at least about 80% conductive filler,
wherein the components are selected to limit crosslinking of the resin during initial drying to less than about 15% such that most of the solvent is evolved, and wherein the paste, when cured, has an electrical resistivity less than about $50 \times 10^{-6}$ ohm-cm and a thermal conductivity greater than about 10 W/mK, and wherein the ratio of conductive filler to the thermosetting resin in the paste is at least 10:1, in parts by weight.

2. A thermosetting adhesive paste according to claim 1 wherein the cured adhesive has an electrical conductivity of less than about $25 \times 10^{-6}$ ohm-cm and a thermal conductivity of greater than about 20 W/mK.

3. A thermosetting adhesive paste according to claim 2 wherein the cured adhesive has an electrical conductivity of less than about $10 \times 10^{-6}$ ohm-cm and a thermal conductivity of greater than about 40 W/mK.

4. A thermosetting adhesive paste according to claim 1 wherein:

the liquid resin consists essentially of at least one cycloaliphatic epoxy resin combined with latent hardener and curing catalyst;

the solvent is selected from at least one of the group consisting of alcohols, ethers, esters, and ketones; and the conductive filler is selected from at least one of the group consisting of Ag, Au, Ni, Cu, Zn, Sn, Pd and Pt.

5. A thermosetting adhesive paste system according to claim 4 wherein the solvent comprises solvent having a vapor pressure sufficiently high to allow greater than about 75% of the solvent to evolve during a 100° C. prebake for 1 hour under a die size of at least about 0.400 inch per side.

6. A thermosetting adhesive paste according to claim 5 wherein the conductive filler consists essentially of Ag powders or flakes having a surface area of about from 0.4 to 2.0 m$^2$/gm, a tap density of about from 2.5 to 5.0 gm/cc, and a weight of surfactant of about from 0.15 to 2.0%.

7. A thermosetting adhesive past according to claim 6 comprising:

less than about 10% by weight of thermosetting resin and;

at least about 7% by weight of solvent;

and wherein the cured adhesive has a thermal conductivity of greater than about 20 W/mK.

8. A thermosetting adhesive of claim 1 wherein the thermosetting liquid resin consists essentially of cycloaliphatic epoxy resin combined with a latent hardener and a curing catalyst in an amount sufficient to minimize crosslinking below 100° C. to less than 15% after 1 hour and to allow at least 95% crosslinking at a temperature of 175° C. for 15 minutes;

the solvent is selected from at least one of the group consisting of alcohols, ethers, esters, and ketones that will evolve at least about 75% of the solvent during a 100° C. prebake for 1 hour under a die size of at least 0.400 inch per side; and the conductive filler is selected from at least one of the group consisting of Ag, Au, Ni, Cu, Zn, Sn, Pd, and Pt.

9. A thermosetting adhesive of claim 1 further comprising about from 1 to 10% by weight of at least one hardness modifying additive selected from the group consisting of tackifiers, elastomers, rubbers, silicones and thermoplastics.

10. A thermosetting adhesive of claim 1 further comprising about from 0.1 to 1% by weight of at least one high surface area solid powder.

11. A thermosetting adhesive paste of claim 1 wherein the paste further comprises at least about 0.1% by weight of thickening agent dissolved in the solvent before combination with the thermosetting liquid resin and the conductive filler.

12. A thermosetting adhesive paste of claim 10 wherein the thickening agent consists essentially of solid ethyl cellulose.

\* \* \* \* \*

UNITED STATES PATENT AND TRADEMARK OFFICE
CERTIFICATE OF CORRECTION

PATENT NO.   : 6,265,471 B1
DATED        : July 24, 2001
INVENTOR(S)  : Dietz

It is certified that error appears in the above-identified patent and that said Letters Patent is hereby corrected as shown below:

Column 11,
Line 8, change "conductivity" to read -- resistivity --.
Line 12, change "conductivity" to read -- resisitivity --.
Line 35, insert -- % -- after weight.

Column 12,
Line 1, change "past" to read -- paste --.
Line 3, change "resin and;" to read -- resin; and --.

Signed and Sealed this

Twenty-third Day of April, 2002

Attest:

JAMES E. ROGAN
*Attesting Officer*     *Director of the United States Patent and Trademark Office*